United States Patent Office 3,637,812
Patented Jan. 25, 1972

3,637,812
ACYLATION OF REACTIVE ORGANIC
ACID ESTERS
Roger J. Tull, Metuchen, Edward W. Tristram, Cranford, and Avery Rosegay, Union, N.J., assignors to Merck & Co., Inc., Rahway, N.J.
No Drawing. Filed Oct. 2, 1967, Ser. No. 671,937
Int. Cl. C07c 69/66
U.S. Cl. 260—484 P  9 Claims

ABSTRACT OF THE DISCLOSURE

Salts of di-loweralkyl hydroxymethylenemalonates are prepared by acylation of diloweralkyl malonate with loweralkyl formate. The reaction is carried out in the presence of a strong base and under reaction conditions where the loss of alkyl formate reactant is either compensated for or minimized.

BACKGROUND OF THE INVENTION

This invention relates to a new and novel method for acylating reactive organic acid esters in which the acylating agent is itself an organic acid ester. A specific example of the process is the acylation of malonic ester with a loweralkyl formate.

It is known in the art to use organic acid esters for the acylation of organo nitriles, as for example the acylation of malonoitrile with methyl formate. It has likewise been known that simple organic acid esters and ketones can be acylated to their hydroxymethylene derivatives with esters such as the lower alkyl formates, but in all of the cases described in the literature the carbon atom to be acylated has only one carbonyl function adjacent to it.

In 1893 Claisen attempted to prepare the hydroxymethylene derivatives of substances such as acetoacetic ester, 1,3-diketones and malonic esters by the method used previously for simple esters, i.e. by treatment with formate esters in the presence of strong base. [Ber. 26, 2729 (1893)]. The proposed reaction could not, however, be successfully carried out and the only products obtained were the alkali metal salts of the starting materials. It was subsequently found [Claisen, Annalen 297, 1 (1879)] that the methylene carbon of acetoacetic esters, malonic esters, and 1,3-diketones could be acylated by reaction of such substances with an appropriate acid chloride. This modification is not, however, suitable for preparing the formyl (hydroxymethylene) derivatives since the necessary acid chloride of formic acid does not exist. That others were unable to overcome the difficulty encountered by Claisen is attested to by the absence from the subsequent literature of any report on the acylation of a reactive ester with formate. Heretofore, the hydroxymethylene derivatives of reactive acids such as malonic acid have had to be made from an orthoformate, and this is an unattractive reaction because the orthoformate starting material is itself difficult to prepare, and the process is low-yielding.

In accordance with the present invention, it has now been found that a reactive ester such as a malonic ester can in fact be acylated to its hydroxymethylene derivative by reaction with a formate ester under certain reaction conditions. Thus, the invention provides for the first time a convenient and high-yielding method for preparing hydroxy-methylenemalonates from malonic esters and alkylformates.

According to this invention, alkali metal salts of loweralkyl hydroxymethylenemalonates are produced by reacting a lower alkylmalonate with a loweralkyl formate in the presence of a strong base using reaction conditions whereby decomposition of the loweralkyl formate is either compensated for or minimized. This may be accomplished by any one or more of several methods, for instance by carrying out the reaction in a closed system, by using an amount of formate reactant in excess of that required for the acylation proper and of that lost by decomposition, by using reaction temperatures where the decomposition of formate ester is minimal, or by employing a highly reactive formate ester such as methyl formate. As discussed more fully hereinbelow, the amount of excess formate required may vary with the particular ester employed and with other reaction conditions.

The acylation reaction of this invention is carried out in the presence of a strong base. It is now known that loweralkyl formates will decompose in the presence of strong base to give an equbrium mixture consisting of lower alkanol, carbon monoxide and alkyl formate. This decarbonylation of formate ester will, if the carbon monoxide is removed from the reaction site, so deplete the formate ester concentration that the acylation of malonate ester to hydroxymethylenemalonate, which is also an equilibrium reaction, cannot proceed to any satisfactory extent. The rate of decarbonylation varies with the temperature and with the particular formate ester present, but will prevent satisfactory formation of hydroxymethylenemalonate if it proceeds unchecked at a rapid rate. It is believed that earlier workers in this field were unsuccessful in achieving acylation because the release of carbon monoxide led to serious depletion of alkyl formate reactant.

As applied to acylation of a malonic ester, the process of this invention can be pictured structurally as:

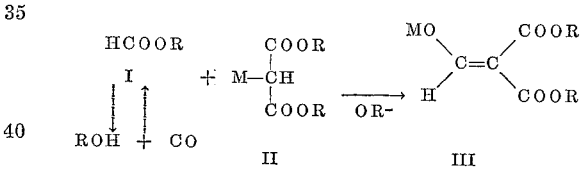

where R represents loweralkyl such as methyl, ethyl, propyl, or butyl, and M represents an alkali metal, preferably sodium or potassium. The broken arrows in the flow sheet illustrate the equilibrium reaction which can lead to critical loss of the alkylformate reactant unless suitable reaction conditions are employed. Compound II is represented as the salt which forms in the presence of the strong base, although the free malonate ester is normally added to the reaction mixture. In describing the invention Compounds II and III are referred to as loweralkyl malonates and loweralkyl hydroxymethylenemalonate salts, it being understood that the malonate ester is a diester.

As previously stated, the success of this invention depends upon minimization of or compensation for loss of alkyl formate reactant. The purpose of these measures is to maintain a sufficient concentration of formate ester to permit the formation in substantial yield and, if desired, the recovery of the loweralkyl hydroxymethylenemalonate salt. This can be accomplished in different ways.

One method of carrying out the acylation reaction is to operate in a closed system so that loss of carbon monoxide does not occur. In this way, some decomposition of formate to carbon monoxide and lower alkanol takes place, but equilibrium is reached rapidly and sufficient formate is present for reaction with the loweralkyl malonate. A variation of this method is to actually generate the alkyl formate in situ by carrying out the reaction in a lower alkanol under positive carbon monoxide pressure. Alkyl formate is produced and reacts with the alkyl malonate salt.

A second method is utilization of methyl formate instead of the higher alkyl esters of formic acid. Methyl formate has been found to be very reactive in the acylation of malonates. The rate of reaction is sufficiently rapid that no special steps are needed to replace formate lost through decomposition. The use of the methyl ester is itself the method for minimizing the undesired decomposition.

A third method for achieving the purpose of the invention is to use a molar excess of alkyl formate. The optimum amount of excess reactant will, of course, vary with the particular ester and other conditions such as temperature because of the rate of decomposition differs under these circumstances. When ethyl formate is used and the reaction carried out at temperatures of above about 50° C., the loss of formate is quite rapid (about 0.2 mole per hour) and a 5–12 fold molar excess is used for best yield of hydroxy-methylenemalonate. The excess reactant may be added at the beginning of the process or portionwise during the course of the reaction. On the other hand, with methyl formate an excess is not needed, although a modest excess of about 1.2 to 2.5 moles per mole of malonate is generally employed for best yields. In an open reaction system the evolution of carbon monoxide is measured readily. This affords a convenient and reliable method for monitoring the extent of decomposition of alkyl formate and the need for additional amounts of the ester.

Still another way of minimizing decomposition of formate ester is to carry out the acylation at lower temperatures than might normally be used. It is generally preferred to use temperatures of about 40–90° C., but temperatures of from about 15–40° C. are employed when temperature adjustment is the method for minimizing decomposition of the formate ester. The lower operating temperatures will, of course, require longer reaction times, i.e. of up to 5–6 days.

It is possible to employ more than one of these methods or techniques at the same time. In a preferred aspect of the invention an excess of the reactive ester methyl formate is used as the acylating agent, and the process is brought about in a closed system to prevent loss of carbon monoxide.

The acylation reaction is carried out in the presence of a strong base, preferably an alkali metal alkoxide such as sodium or potassium methoxide, sodium or potassium ethoxide and sodium or potasium propoxide. It is preferred to bring about the reaction in an alcoholic solvent medium, the alcohol corresponding to the particular malonate and formate ester being utilized. As will be understood by those skilled in the art, it is also preferred that the alkali metal alkoxide correspond to the particular alcohol used as solvent. This is common practice in the art and serves to preclude any ester interchange which might lead to a mixture of end products. It should, however, be understood that the basic reaction, namely the formation of the hydroxymethylene-malonate salt from malonic ester is not dependent upon the particular ester, alkoxide or alcoholic solvent employed.

The coure of the reaction may be conveniently followed by ultraviolet measurement of the amount of hydroxymethylene-malonate salt present. Generally, at reaction temperatures of from about 40–90° C. and at atmospheric pressure, the reaction is substantially completed in from 2 to 10 hours. When the reaction is carried out under pressure, the temperature may be increased to about 100–125° C. but the preferred reaction time is substantially the same. At lower temperatures, i.e. 15–40° C., a number of days is normally required for optimum yields.

The diloweralkyl hydroxymethylenemalonate is formed as a metal salt, the particular salt being, of course, dependent upon the base used as catalyst. Certain of these salts such as methyl hydroxymethylenemaleonate sodium salt, are insoluble at the reaction temperature. Those having a greater solubility in the reaction medium are readily recovered by crystallization at low temperature. It is preferred to recover the salt and if desired convert the isolated salt to the hydroxymethylenemalonate since the free hydroxymethylene compound is somewhat unstable in the reaction mixture.

The loweralkyl hydroxymethylenemalonate salts obtained are converted to the corresponding loweralkyl hydroxymethylenemalonate by treatment with a strong acid such as hydrochloric, hydrobromic or sulfuric acid. Either these latter compounds or the salts may be alkylated to the corresponding loweralkyl alkoxymethylenemalonates by treatment with an alkylating agent such as a diloweralkyl sulfate or an alkyl halide such as dimethyl sulfate, diethyl sulfate, methyl iodide, ethyl bromide and the like. The loweralkyl alkoxymethylene malonates are useful as intermediates in making quinoline carboxylic acid esters having anticoccidial activity, as described in U.S. Pat. No. 3,267,106.

The following examples are given for the purpose of illustration and not by way of limitation.

EXAMPLE 1

23 grams (1.0 m.) of sodium is added in small portions to 500 ml. of methanol over a period of 20 minutes. Any refluxing that occurs is allowed to subside before making successive additions of sodium. The sodium methoxide solution thus obtained is cooled to 55–60° C., and 114 ml. (1.0 m.) of methyl malonate is added. 125 ml. (2.0 m.) of cold methyl formate is finally added (this addition reducing the temperature to 35–40° C.). The resulting mixture is stirred at 50° C. for 6 hours during which time a thick slurry forms, the solid consisting of methyl hydroxymethylenemalonate sodium salt. During the reaction period carbon monoxide equivalent to 0.3 m. of methyl formate is evolved.

The thick slurry is cooled to 20° C. and filtered. The solid product is washed with 100 ml. of methanol and dried in vacuo at 60–70° C. for 3 hours. There is obtained 133 g. (73%) of methl hydroxymethylenemalonate sodium salt, M.P. 260–265° C. (dec.).

When an equivalent amount of potassium methoxide is used in the above reaction instead of sodium methoxide, the potassium salt of methyl hydroxymethylenemalonate is obtained.

EXAMPLE 2

A solution of 18 g. (0.33 m.) of sodium methoxide, 38 ml. (0.33 m.) of methyl malonate and 62 ml. (1.0 m.) of methylformate in 210 ml. of methanol is heated at 80° C. for 2½ hours in a glass-lined sealed bomb. At the end of the reaction period, the bomb is opened and the colorless slurry removed. The solid methyl hydroxymethylenemalonate sodium salt is recovered by filtration, washed with 30 ml. of methanol and dried in vacuo to afford 47 g. (78%) of substantially pure material.

EXAMPLE 3

A solution of 18 g. (0.33 m.) of sodium methoxide and 38 ml. (0.33 m.) of methyl malonate in 200 ml. of methanol is added to a glass-lined bomb. The bomb is pressurized with 1150 p.s.i. of carbon monoxide, and heated at 100° C. for 3 hours. At the end of this time the pressure is released and the resulting thick paste fluidized by addition of 100 ml. of methanol and 100 ml. of ether. The solid methyl hydroxymethylene malonate sodium salt is separated by filtration, washed with 300 ml. of diethyl ether and dried in vacuo at 60° C. for 3 hours. There is obtained 49 g. (82%) of substantially pure material.

When this example is repeated using equimolar amounts of sodium ethoxide and ethyl malonate in ethanol, there is obtained ethyl hydroxymethylene malonate sodium salt.

EXAMPLE 4

(A) 23 grams (1.0 m.) of sodium is dissolved in 600 ml. of methanol and to this solution there is added 114 ml. (1 m.) of methyl malonate and 124 ml. (2 m.) of methyl formate. The mixture is stirred at 50° C. for 6 hours, at the end of which time the thick slurry is filtered and the solid methyl hydroxymethylenemalonate sodium salt washed with 100 ml. of methanol. The methanol wash is added to the reaction mother liquors. The solid is dried in vacuo to afford a 71% yield of product.

(B) 23 grams of sodium is added in portions to 100 ml. of methanol and the resulting slurry of sodium methoxide stirred at reflux temperature for 2½ hours.

114 ml. (1.0 m.) of methyl malonate is added to the combined mother liquor and methanol wash obtained above (525 ml.) and this solution added to the sodium methoxide slurry at 70° C. The temperature of the solution drops to about 50° C. 100 ml. (1.62 m.) of methyl formate is then added and the reaction mixture stirred at 50° C. for 6 hours. It is allowed to stand at room temperature for 12 hours and the solid methyl hydroxymethylenemalonate sodium salt recovered by filtration, washed with 100 ml. of methanol and dried in vacuo. There are obtained 177 g. of product (97%, based on charged methyl malonate).

(C) The experiment of part B above is repeated using as the reaction solvent the combined mother liquor and methanol wash obtained in part B. There is obtained methyl hydroxymethylenemalonate sodium salt in 98% yield.

EXAMPLE 5

11.5 grams (0.5 m.) of sodium is dissolved in 300 ml. of ethanol, and 76 ml. (0.5 m.) of ethyl malonate and 81 ml. (1.0 m.) of ethyl formate added to the solution. The mixture is refluxed at 68° C. for 21 hours, during which time 20 ml. (0.21 m.) of ethyl formate is added every hour to replace the decomposed ethyl formate (measured by carbon monoxide evolution). The mixture is cooled to about 5–10° C. and the resulting solid ethyl hydroxymethylene malonate sodium salt recovered by filtration, washed with 50 ml. of cold ethanol and dried in vacuo to about 65° C. There is obtained 68 g. (62%) of product.

EXAMPLE 6

18.2 grams (0.1 m.) of methyl hydroxymethylenemalonate sodium salt is dissolved in 90 ml. of water and 17 ml. (0.2 m.) of concentrated hydrochloric acid added to the solution. Methyl hydroxymethylenemalonate separates as an oil which crystallizes rapidly. The resulting mixture is cooled to about 5° C. and the solid product filtered, washed with 10 ml. of ice water and dried in vacuo at 25° C. There is obtained 12.6 g. (79%) of methyl hydroxymethylenemalonate, M.P. 41–44° C. The same material is obtained by similar treatment of the potassium salt with hydrochloric acid.

EXAMPLE 7

A slurry of 9.1 g. (0.05 m.) of methyl hydroxymethylenemalonate sodium salt and 9.8 ml. (0.1 m.) of dimethyl sulfate in 75 ml. of toluene is stirred at reflux for 2 hours. At the end of this time the solid sodium methyl sulfate is separated and the filtrate concentrated in vacuo to an oil. The oil is flushed with hexane. The residue crystallizes on standing to afford 8.6 g. of methyl methoxymethylmalonate.

Any departure from the above description which conforms to the present invention is intended to be included within the scope of the claims.

What is claimed is:

1. The process for preparing alkali metal salts of lower alkyl hydroxymethylene-malonate that comprises reacting lower alkyl malonate with lower alkyl formate in the presence of an alkali metal alcoholate, under reaction conditions which allow the concentration of lower alkyl formate to be maintained during the reaction.

2. The process of claim 1 wherein the concentration of loweralkyl formate is maintained by employing a molar excess of said formate.

3. The process of claim 1 wherein the concentration of loweralkyl formate is maintained by carrying out the reaction in a closed system.

4. The process of claim 3 wherein the closed system is under positive carbon monoxide pressure.

5. The process of claim 1 wherein the concentration of loweralkyl formate is maintained by carrying out the reaction at a temperature of about 20–35° C.

6. The process of claim 1 wherein the concentration of formate ester is maintained by employing methyl formate as the formate ester.

7. The process for preparing alkali metal salts of dimethyl hydroxymethylene-malonate that comprises reacting methyl formate with dimethyl malonate in the presence of an alkali metal alcoholate, under reaction conditions which allow the concentration of methyl formate to be maintained during the reaction.

8. The process of claim 7 wherein the reaction is carried out at from 40–65° C. with a molar excess of methyl formate.

9. The process of claim 8 wherein the reaction is carried out in methanol in the presence of sodium methoxide.

References Cited

UNITED STATES PATENTS 3,267,106    8/1966    Watson _____ 260—287

LORRAINE A. WEINBERGER, Primary Examiner

P. J. KILLOS, Assistant Examiner